United States Patent
Segawa et al.

(10) Patent No.: US 8,970,907 B2
(45) Date of Patent: Mar. 3, 2015

(54) IMAGE INSPECTION DEVICE, PROGRAM PRODUCT, AND METHOD COMPARING TARGET PRINT PAGE DATA AND DISPLAY PAGE DATA TO CREATE DIFFERENTIAL PAGE IMAGE ATTRIBUTE INFORMATION

(71) Applicant: Dainippon Screen Mfg. Co., Ltd., Kyoto (JP)

(72) Inventors: Hiroyuki Segawa, Kyoto (JP); Koji Matsuo, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 0 days.

(21) Appl. No.: 14/276,021

(22) Filed: May 13, 2014

(65) Prior Publication Data
US 2014/0368887 A1   Dec. 18, 2014

(30) Foreign Application Priority Data

Jun. 14, 2013 (JP) .................. 2013-125622

(51) Int. Cl.
G06K 15/02 (2006.01)
H04N 1/00 (2006.01)
(52) U.S. Cl.
CPC ........ G06K 15/1868 (2013.01); G06K 15/1894 (2013.01)
USPC ............................ 358/1.9; 358/3.24; 358/406
(58) Field of Classification Search
None
See application file for complete search history.

(56) References Cited

U.S. PATENT DOCUMENTS

| 5,473,748 | A | 12/1995 | Date et al. |
| 7,440,123 | B2 * | 10/2008 | Chodagiri et al. ........... 358/1.18 |
| 7,724,922 | B2 | 5/2010 | Furukawa et al. ............ 382/112 |
| 8,127,230 | B2 * | 2/2012 | Hirayama et al. ............ 715/274 |
| 8,432,557 | B2 * | 4/2013 | Miyata ........................... 358/1.9 |
| 8,643,882 | B2 * | 2/2014 | Takahashi .................... 358/1.15 |
| 2004/0086155 | A1 | 5/2004 | Furukawa et al. |
| 2013/0250370 | A1 * | 9/2013 | Kojima et al. ................ 358/405 |

FOREIGN PATENT DOCUMENTS

JP   2004-203016   7/2004

OTHER PUBLICATIONS

International Search Report for corresponding European Application No. EP 14 16 04 22 dated Oct. 27, 2014.
*Acrobat 9: Adding Layers to PDF Documents*, Jun. 3, 2008., pp. 1-16, XP055145688, Ted Padova, Acrobat Tutorial.

\* cited by examiner

*Primary Examiner* — Scott A Rogers
(74) *Attorney, Agent, or Firm* — Ostrolenk Faber LLP

(57) ABSTRACT

When a differential page image is created by comparing a target inspection page image and an inspection page image, differential page image attribute information which is an inspection result is created by acquiring attribute information of an image region of the target inspection page image and an image region of the inspection page image corresponding to the differential page image, from target inspection page image data and inspection page image data.

17 Claims, 9 Drawing Sheets

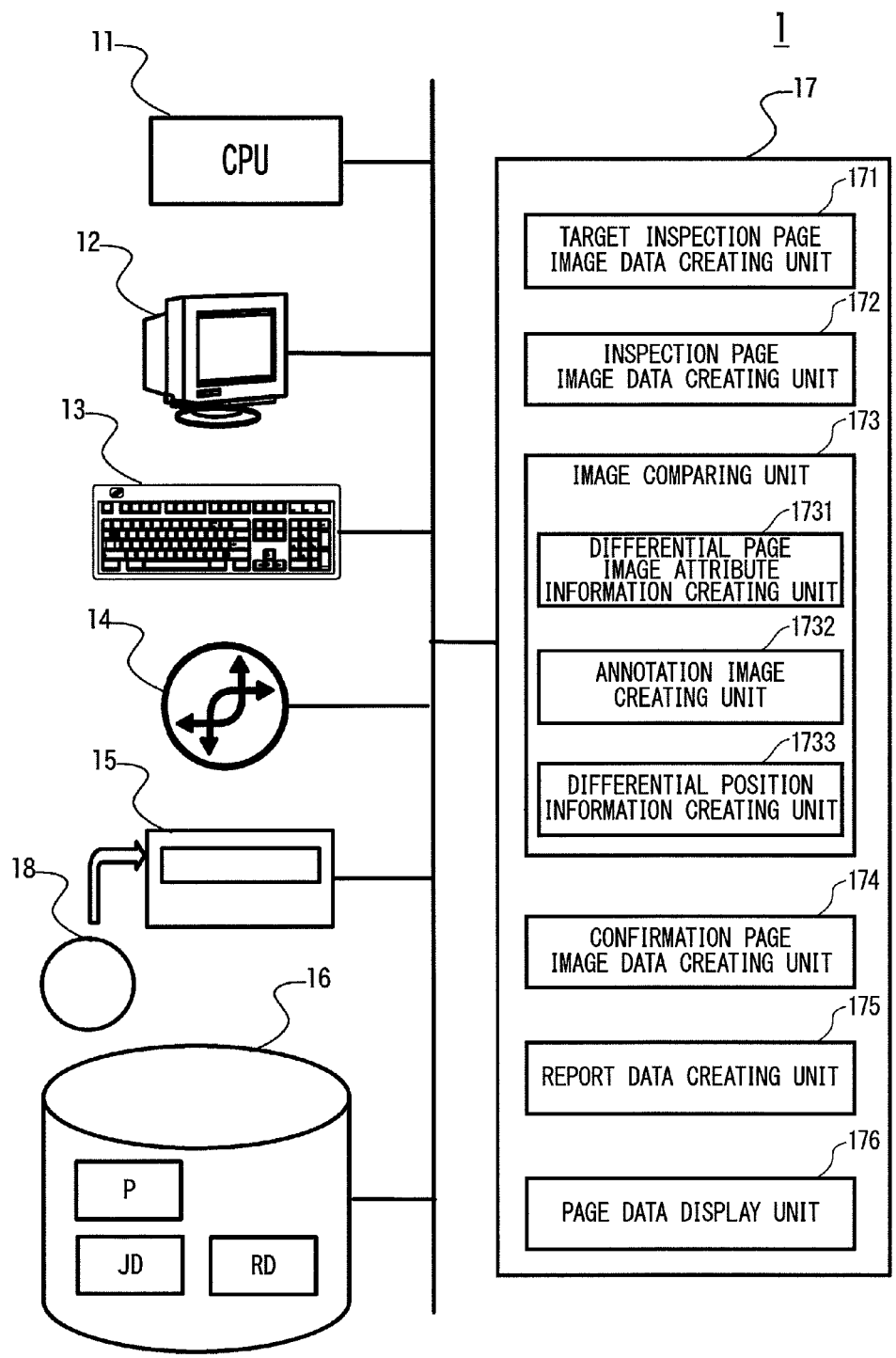

F I G. 3
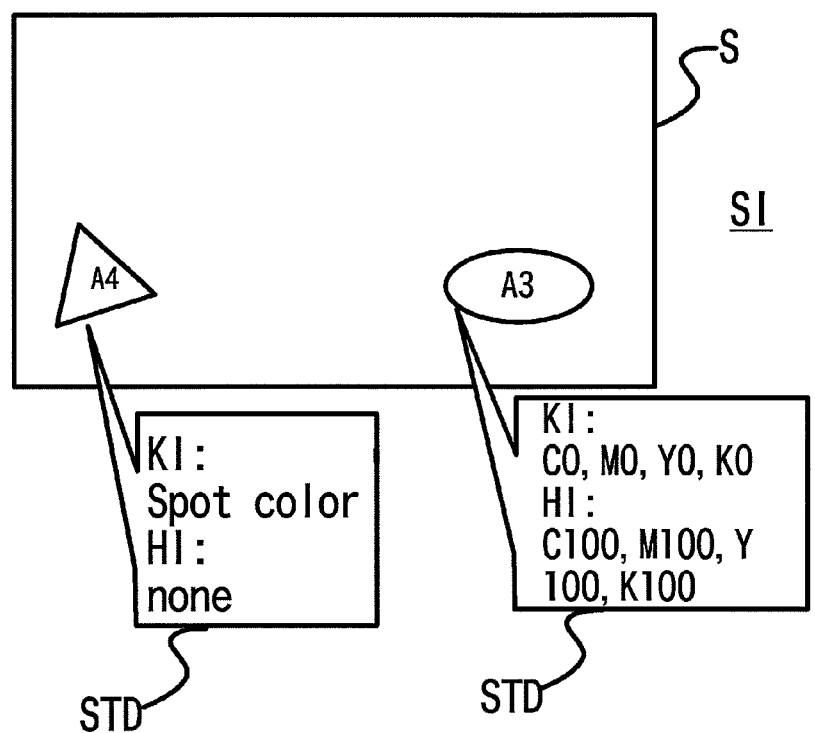

F I G. 4
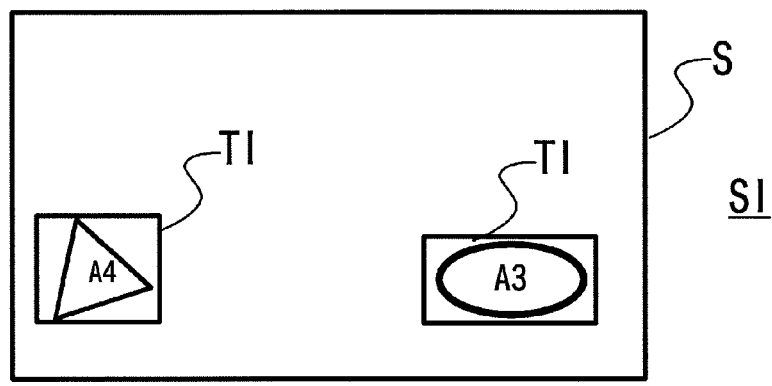

IMAGE INSPECTION DEVICE, PROGRAM PRODUCT, AND METHOD COMPARING TARGET PRINT PAGE DATA AND DISPLAY PAGE DATA TO CREATE DIFFERENTIAL PAGE IMAGE ATTRIBUTE INFORMATION

BACKGROUND OF THE INVENTION

1. Field of the Invention

The present invention relates to an image inspection data creating device, a computer-readable recording medium having an image inspection data creating program recorded thereon, and an image inspection data creating method which create data for inspecting an image represented by page data to be printed and an image which is represented by print data which is obtained by converting the page data and is outputted to a printing machine.

2. Description of the Background Art

Page data which represents a page image of a print image created by a page description language such as PostScript (the registered trademark of Adobe Systems Incorporated) or PDF is generally printed by first rasterizing (referred to as "RIP" below) the page data and using the print data created by the RIP.

In such a case, the page data created by electronic processing and the printed data obtained as a result of performing the RIP on the page data are both electronic data. Hence, at a stage before a printed material is provided by a printing machine, a page image represented by page data and a print image represented by print data obtained as a result of performing RIP on the page data can be confirmed only through a display element (more specifically, a display element such as a liquid crystal display, a CRT or an organic EL display) of a computer which processes the page data or the print data.

In this regard, Japanese Patent Application Laid-Open No. 2004-203016 displays the prior art of performing image inspection by comparing a page image represented by page data and a print image represented by print data.

Japanese Patent Application Laid-Open No. 2004-203016 discloses detecting a difference by comparing images represented by data created in different process between plate making process and printing process (that is, by comparing a page image represented by page data created in page data creation process and a print image represented by print data created in process of performing RIP on the page data).

However, a conventional aspect has a problem that, when a difference is detected, whether the difference is caused by page data or print data cannot be confirmed.

When, for example, page data is created using a font which is not implemented on a device which performs RIP, or when page data in which a color which cannot be used by a printing machine is specified to an object on a page, a difference between a page image represented by page data and a print image represented by print data is produced by creation of the page data.

Hence, a mechanism which has a page data creator confirm a comparison result of a page image represented by page data and a print image represented by print data and confirm whether the difference is produced by the page data or the print data is necessary.

Further, when, upon creation of print data, calling an object linked in page data fails and RIP is performed, or when an arrangement direction of an object on a page is inverted and RIP is performed, a difference between a page image represented by page data and a print image represented by print data is produced by a trouble caused by RIP in some cases.

Hence, a mechanism which has a RIP operator confirm a comparison result of a page image represented by page data and a print image represented by print data and confirm whether the difference is produced by the page data or the print data is necessary.

SUMMARY OF THE INVENTION

The present invention can adopt the following modes or Application Examples to solve at least part of these problems.

Application Example 1

An image inspection data creating device includes: a target inspection page image data creating element which creates target inspection page image data corresponding to print page image data to be printed by a printing machine, based on page data for creating a printed material; an inspection page image data creating element which creates inspection page image data corresponding to display page image data to be displayed on a page data display device, based on the page data; a differential page image data creating element which creates differential page image data by comparing a target inspection page image represented by the target inspection page image data and an inspection page image represented by the inspection page image data; and a differential page image attribute information creating element which creates differential page image attribute information by acquiring attribute information of an image region of the target inspection page image and an image region of the inspection page image corresponding to a differential page image represented by the differential page image data, from the target inspection page image data and the inspection page image data.

By creating the differential page image by comparing the target inspection page image and the inspection page image, and acquiring attribute information of the image region of the target inspection page image and the image region of the inspection page image corresponding to the differential page image, from the target inspection page image data and the inspection page image data, it is possible to create differential page image attribute information which is image inspection data.

By displaying the confirmation page image including the created differential page image attribute information, it is possible to easily confirm whether an image region of the differential page image is produced by print RIP or original page data.

Application Example 2

In the image inspection data creating device, the differential page image data creating element creates annotation image data which emphasizes a presence of the differential page image represented by the differential page image data.

Application Example 3

In the image inspection data creating device, the differential page image data creating element acquires a position of the differential page image from the page data, and creates differential position information.

Application Example 4

The image inspection data creating device includes a confirmation page image creating element which creates confirmation page image data which adopts a hierarchical structure which allows the target inspection page image, the inspection page image and the differential page image to be switched and displayed, and which includes the differential page image attribute information as a comment on the differential page image.

Application Example 5

In the image inspection data creating device, the confirmation page image data creating element adds the annotation image data to the hierarchical structure of the confirmation page image data which can be switched and displayed.

Application Example 6

In the image inspection data creating device, the confirmation page image data creating element adds the differential position information as the comment of the confirmation page image data.

Application Example 7

The image inspection data creating device includes a report data creating element which associates and stores the confirmation page image data and the page data based on which the confirmation page image data is created, and creates report data of a same data format as that of the page data.

Application Example 8

The image inspection data creating device includes a display element which displays the differential page image attribute information.

Application Example 9

A recording medium has a program which causes a computer to function as an image inspection data creating device and which is executed in a memory by a CPU of the computer recorded thereon, and can be read by the computer, and, when the program is executed by the computer, the program causes the image inspection data creating device to execute: a target inspection page image data creating step of creating target inspection page image data corresponding to print page image data to be printed by a printing machine, based on page data for creating a printed material; an inspection page image data creating step of creating inspection page image data corresponding to display page image data to be displayed on a page data display device, based on the page data; a differential page image data creating step of creating differential page image data by comparing a target inspection page image represented by the target inspection page image data and an inspection page image represented by the inspection page image data; and a differential page image attribute information creating step of creating differential page image attribute information by acquiring attribute information of an image region of the target inspection page image and an image region of the inspection page image corresponding to a differential page image represented by the differential page image data, from the target inspection page image data and the inspection page image data.

Application Example 10

An image inspection data creating method includes the steps of: a) creating target inspection page image data corresponding to print page image data to be printed by a printing machine, based on page data for creating a printed material; b) creating inspection page image data corresponding to display page image data to be displayed on a page data display device, based on the page data; c) creating differential page image data by comparing a target inspection page image represented by the target inspection page image data and an inspection page image represented by the inspection page image data; and d) creating differential page image attribute information by acquiring attribute information of an image region of the target inspection page image and an image region of the inspection page image corresponding to a differential page image represented by the differential page image data, from the target inspection page image data and the inspection page image data.

It is therefore an object of the present invention to provide an image inspection data creating device, a computer-readable recording medium having an image inspection data creating program recorded thereon, and an image inspection data creating method which create image inspection data which allows a difference to be confirmed in both environments of a page data creator and a RIP operator and can make it easy to confirm whether the difference is caused by page data creation process or RIP process.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view for explaining an image inspection data creating device 1;

FIG. 3 is a view for explaining differential page image attribute information STD of a differential page image SI;

FIG. 4 is a view for explaining a state where annotation images TI are attached to the differential page image SI;

DESCRIPTION OF THE PREFERRED EMBODIMENTS

Figure 2A:
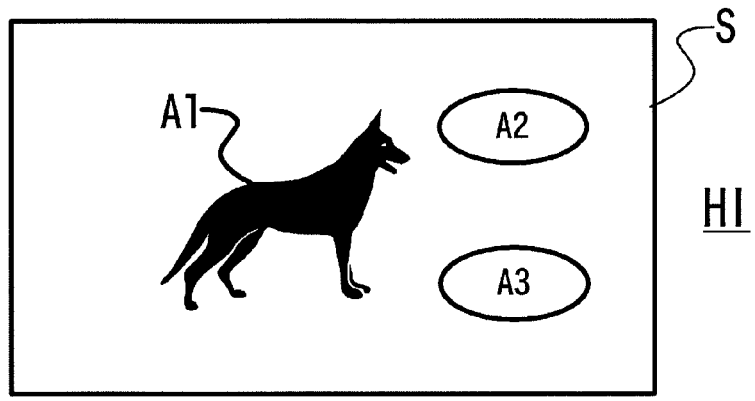
FIGS. 2A, 2B and 2C are views each for explaining image comparison performed by an image comparing unit 173.

Hereinafter, a preferred embodiment of the present invention will be described using the drawings.

FIG. 1 is a view for explaining an image inspection data creating device 1 according to the present invention. The image inspection data creating device 1 employs the same configuration as those of computers which are generally used, and has a CPU 11, a display unit 12, an input unit 13, a network I/F 14, a media drive 15, a storage unit 16 and a memory 17.

The CPU 11 controls the entire image inspection data creating device 1. Particularly, the CPU 11 implements a function of the image inspection data creating device 1 by executing in the memory 17 a program P recorded in a media disk 18 inserted in the media drive 15.

The display unit 12 is used to display information which is necessary for image inspection processing. Further, the display unit 12 is used to confirm an image inspection result by displaying report data RD created by process described below.

The input unit 13 includes a mouse and a keyboard, and is used by an operator to input a command to the image inspection data creating device 1.

The network I/F 14 connects the image inspection data creating device 1 and a network which is not illustrated. The image inspection data creating device 1 can receive through the network I/F 14 job data JD (described below) in which page data is stored, from a terminal which is not illustrated and is connected to the network. Further, the image inspection data creating device 1 can also download through the network I/F 14 the program P which implements the function of the image inspection data creating device 1 from a server which is not illustrated. Furthermore, the image inspection data creating device 1 can transmit through the network I/F 14 the report data RD to the terminal which is not illustrated.

The media drive 15 is used to read the program P recorded in the media disk 18. The program P read by the media drive 15 implements the function of the image inspection data creating device 1.

The storage unit 16 stores the program P read by the media drive 15. Further, the storage unit 16 stores the job data JD, too. Furthermore, the storage unit 16 stores the report data RD created by the process described below, too.

The memory 17 is a work area which allows the CPU 11 to execute the program P stored by the storage unit 16. The CPU 11 executes the program P and, as a result, in the memory 17, functions of a target inspection page image data creating unit 171, an inspection page image data creating unit 172, an image comparing unit 173, a confirmation page image data creating unit 174, a report data creating unit 175 and a page data display unit 176 are implemented.

The target inspection page image data creating unit 171 creates target inspection page image data by performing RIP corresponding creation of print page image data to be printed by a printing machine, on page data.

The RIP performed by the target inspection page image data creating unit 171 is conversion processing of creating a multilevel bitmap image used to be printed by a printing machine which is not illustrated, based on page data. When, for example, a data format of page data is PDF, the target inspection page image data creating unit 171 is implemented by the print RIP such as ADOBE PRINT Engine (the trademark of Adobe Systems Incorporated).

The inspection page image data creating unit 172 creates inspection page image data by performing RIP corresponding to creation of display page image data to be displayed on a page data display device, on the page data.

The RIP performed by the inspection page image data creating unit 172 is conversion processing of, based on the page data, creating multilevel bitmap image data used to be displayed on the display unit 12 whose function as the page data display device is implemented by the page data display unit 176 described below. When, for example, a data format of page data is PDF, the inspection page image data creating unit 172 is implemented by the display RIP such as ADOBE PDF Library (the trademark of Adobe Systems Incorporated) using the common core of PDF display/creation application ACROBAT (the trademark of Adobe Systems Incorporated).

That is, RIP performed by the target inspection page image data creating unit 171 and the inspection page image data creating unit 172 is different RIP of the print RIP and the display RIP. Therefore, target inspection page image data and inspection page image data which are image data obtained by performing different RIP on the same page data do not necessarily provide the same result.

The image comparing unit 173 compares a target inspection page image represented by the target inspection page image data and an inspection page image represented by the inspection page image data, and creates differential page image data when a difference is produced as a result of comparison.

Figure 2B:
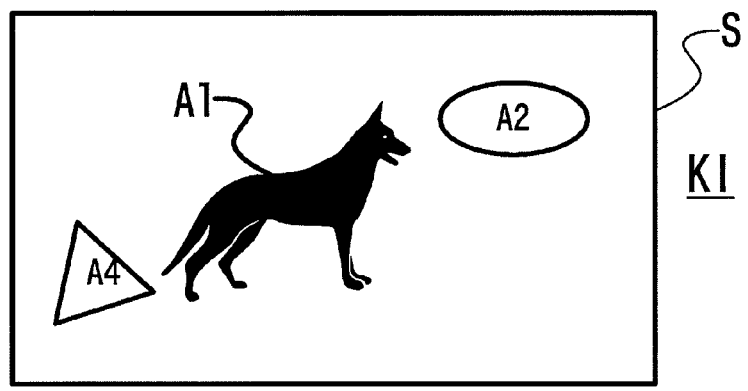
Figure 2C:
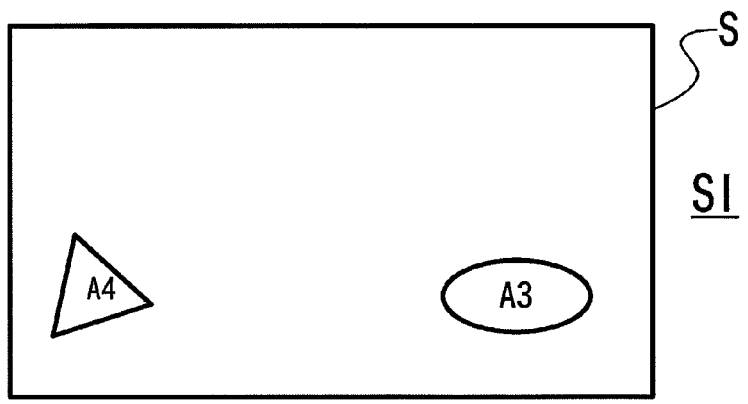

FIGS. 2A, 2B and 2C are views for explaining image comparison performed by the image comparing unit 173. When there is an inadequately described portion of page data or when failure occurs in RIP performed by the target inspection page image data creating unit 171, if a target inspection page image and an inspection page image obtained by performing different RIP on the same page data are compared, a differential page image is produced. In this case, the image comparing unit 173 creates differential page image data which represents the differential page image.

FIG. 2A is a view illustrating a target inspection page image HI. As a result of performing RIP corresponding to the print RIP on page data, the target inspection page image data creating unit 171 creates target inspection page image data which represents the target inspection page image HI.

In an example in FIG. 2A, the target inspection page image data represents the target inspection page image HI including three image regions A1, A2 and A3 in a page S. The target inspection page image data creating unit 171 performs the same RIP as that of creation of print page image data, and therefore a printed material obtained as a result of printing page data is supposed to be a printed material which is represented as in FIG. 2A.

Meanwhile, FIG. 2B is a view illustrating an inspection page image KI. As a result of performing RIP corresponding to the display RIP on page data, the inspection page image data creating unit 172 creates inspection page image data which represents the inspection page image KI.

In an example in FIG. 2B, the inspection page image data also represents three image regions A1, A2 and A4 in the page S. The inspection page image data creating unit 172 performs the same RIP as that of creation of display page image data, and therefore a page image represented by the inspection page image KI illustrated in FIG. 2B is the same image as an image which represents page content created by a page data creator.

That is, as illustrated in FIGS. 2A and 2B, even when the target inspection page image data creating unit 171 and the inspection page image data creating unit 172 perform RIP on the same page data, the created target inspection page image HI and inspection page image KI do not necessarily become the same image. Although the page data creator originally intends to create page data which represents a page such the inspection page image KI, RIP is performed using resources which are different between the print RIP and the display RIP and therefore content of processing performed on the page data becomes different, and, as a result, the target inspection page image HI and the inspection page image KI become different images in some cases.

It is assumed that, upon, for example, creation of page data, an ink color (referred to as a spot color) other than ink colors of CMYK used for printing is specified to the image region A4. In this case, the inspection page image data creating unit 172 performs adequate processing on the image region A4 in which the spot color is used, and therefore the image region A4 is present in FIG. 2B. Meanwhile, in this case, the target inspection page image data creating unit 171 processes only regions to which the ink colors of CMYK used for printing are specified, and the image region A4 in which the spot color is used is not present in FIG. 2A.

By contrast with this, it is assumed that, upon creation of page data, the image region A3 is not created. In this case, naturally, the inspection page image data creating unit 172 does not process the image region A3, and therefore the image region A3 is not present in FIG. 2B. Meanwhile, when the target inspection page image data creating unit 171 processes the image region A3 having the same shape as that of the image region A2 in this case assuming that the image region A3 is present due to a trouble upon RIP, the image region A3 which is not originally present in FIG. 2A becomes present.

Hence, as a result of comparing the target inspection page image HI and the inspection page image KI, the image comparing unit 173 creates a differential page image SI as illustrated in FIG. 2C. The differential page image SI is an image which does not include the image regions A1 and A2 which are commonly present in FIGS. 2A and 2B and includes the image region A3 which is present only in FIG. 2A and the image region A4 which is present only in FIG. 2B.

Various conditions to create differential page image data by comparing the target inspection page image HI and the inspection page image KI can be set by the image comparing unit 173. Quality of image comparison performed by the image comparing unit 173 can be selected from the following settings of levels of comparison and inspection upon image comparison.

Inspection Level/Low: Check only significant difference
Inspection Level/Middle: Check with intermediate quality
Inspection Level/High: Check even lack of characters
Inspection Level/Custom: Check with desired quality Meanwhile, according to "inspection level/low", only when a difference is produced in a region of a certain size or more, the image comparing unit 173 finds a difference in a comparison result of the target inspection page image HI and the inspection page image KI. By contrast with this according to "inspection level/high", even when a difference is produced in terms of details which do not cause a problem upon practical use such as a difference in a serif of character font and the like, the image comparing unit 173 finds a difference in the comparison result. According to "inspection level/middle", comparison is performed at an intermediate level between "inspection level/low" and "inspection level/high".

Further, according to "inspection level/custom", the inspection level is changed within a range of "inspection level/low" to "inspection level/high". According to "inspection level/custom", a "shake amount", an "allowable value", "isolated point replacement" and the like can be set.

Upon comparison of the target inspection page image HI and the inspection page image KI, when so-called pixel shift occurs between the target inspection page image HI and the inspection page image KI, the pixel shift is canceled and an original differential value or the like is detected by virtually shifting an arrangement position of one of images and comparing both of the images. In this regard, a virtual shift amount is the "shake amount". When the shake amount is a little, the difference produced as a result of image comparison becomes significant, and, when the shake amount is great, the difference becomes a little.

The "allowable value" is an allowable range of a difference between image sizes, a difference between image positions or a density difference between images upon comparison of the target inspection page image HI and the inspection page image KI. When the allowable value is small, the difference produced as a result of image comparison becomes significant, and, when the allowable value is high, the difference becomes a little.

The "isolated point replacement" is a setting to determine whether or not to remove an image when the image of a small size which do not originally present is detected upon image comparison. When the isolated point replacement is set, based on a separately set isolated point size, isolated points having the size or less are not regarded as differences and removed. By this means, it is possible to easily inspect the differential page image SI.

Further, the condition setting of the image comparing unit 173 additionally includes the setting of a comparison target page. For example, the comparison target page setting enables selection of a setting related to the number of items of page data whose images are compared from the below.

Automatic: The number of items of page data determined based on a page division range which takes into account a reuse part which is an independent image when variable data printing is performed or a load upon use of a plurality of RIP is set as the number of items of page data which are image comparison targets.

Specified Page: Page data specified by an operator of the image inspection data creating device 1 is determined as page data which is an image comparison target.

All Pages: All items of page data are determined as page data which is an image comparison target.

Thus, by allowing the setting related to the number of items of page data whose images are compared to be selected, it is possible to settle a time required for image comparison performed by the image comparing unit 173, in a range desired by the operator.

The image comparing unit 173 has a differential page image attribute information creating unit 1731, an annotation image creating unit 1732 and a differential position information creating unit 1733 which are elements which make it easy to confirm the differential page image SI represented by differential page image data.

The differential page image attribute information creating unit 1731 acquires attribute information of each image region (that is, an image region of the target inspection page image HI and an image region of the inspection page image KI) of each image corresponding to the differential page image SI represented by the differential page image data obtained as a result of comparison performed by the image comparing unit 173, from the target inspection page image data and the inspection page image data, and creates differential page image attribute information STD.

More specifically, the differential page image attribute information creating unit 1731 extracts a color density of the image region of the target inspection page image HI corresponding to the differential page image SI, as attribute information of the image region from the target inspection page image data.

Further, the differential page image attribute information creating unit 1731 extracts a color density, designation of overprint and designation of a spot color of the image region of the inspection page image KI corresponding to the differential page image SI, as attribute information of the image region from the inspection page image data.

Further, the differential page image attribute information creating unit 1731 combines the attribute information extracted from the target inspection page image data and the attribute information extracted from the inspection page image data, and creates the differential page image attribute information STD.

The created differential page image attribute information STD is information as image inspection data for specifying the cause that the differential page image SI is produced, and is used as a comment of confirmation page image data in the process described below.

FIG. 3 is a view for explaining the differential page image attribute information STD of the differential page image SI. FIG. 3 illustrates a state where two pieces of the differential page image attribute information STD are attached to the image regions A3 and A4 of the differential page image SI created in FIG. 2C.

The differential page image attribute information creating unit 1731 extracts color density information from the target inspection page image HI and the inspection page image KI of the image region A3 in the differential page image SI in FIG. 3, and the differential page image attribute information STD of "HI: C100, M100, Y100, K100" and "KI: C0, M0, Y0, K0" is displayed. By this means, it is learned that, while there is no color density of the image region A3 (=there is no region) in the inspection page image KI (originally desired page), there is a color density of the image region A3 in the target inspection page image HI. Consequently, by confirming the differential page image attribute information STD, the operator of the image inspection data creating device 1 can determine that there is a problem with RIP performed to create the target inspection page image HI.

Meanwhile, for the image region A4 of the differential page image SI in FIG. 3, the differential page image attribute information creating unit 1731 extracts that "spot color" is specified to the image region A4 of the inspection page image KI. Meanwhile, "none" which indicates that attribute information cannot be extracted from a region corresponding to the image region A4 of the target inspection page image HI is the differential page image attribute information STD. Consequently, by confirming the differential page image attribute information STD, the operator of the image inspection data creating device 1 can determine that there is a problem caused by specifying a spot color which cannot be printed in the image region A4 of created page data.

The annotation image creating unit 1732 creates an annotation image TI for emphasizing the presence of the differential page image SI created by the image comparing unit 173.

FIG. 4 is a view for explaining a state where the annotation images TI are attached to the differential page image SI. FIG. 4 illustrates a state where the two annotation images TI are attached to the image regions A3 and A4 of the differential page image SI created in FIG. 2C. The annotation images TI emphasize the image regions A3 and A4 in the differential page image SI, so that, when the differential page image SI is displayed, the operator of the image inspection data creating device 1 can easily pay attention to the image regions A3 and A4.

The annotation image creating unit 1732 acquires a circumscribing rectangle of each image region of the differential page image SI, and creates the annotation image TI such that an outline in the circumscribing rectangle appears. The annotation image data creating unit 1732 creates annotation image data of the annotation image TI including position information of the circumscribing rectangle.

In addition, the shape of the annotation image TI is not limited to the circumscribing rectangle of the image region, and may be a circle which has a predetermined radius about a gravity center of the image region. Further, the annotation image creating unit 1732 may create the annotation image TI by setting color information different from color information which original pixels have, to the differential page image SI. According to this processing performed by the annotation image creating unit 1732, when the image regions A3 and A4 of the differential page image SI are displayed, the operator of the image inspection data creating device 1 can easily pay attention to the image regions A3 and A4.

The annotation image creating unit 1732 creates the annotation images TI which emphasize the differential page image SI, so that it is possible to easily confirm a difference between the target inspection page image HI and the inspection page image KI in the process described below.

The created annotation page image data is used to be added to confirmation page image data in the process described below.

The differential position information creating unit 1733 acquires offset information of positions of the annotation images TI based on a reference point of the target inspection page image HI or the inspection page image KI, and creates differential position information. The differential position information creating unit 1733 further handles as differential position information even information for specifying the position information of the annotation images TI attached to the differential page image SI (more specifically, a page number of the job data JD of page data based on which the differential page image SI to which the annotation images TI are attached is created, a name of the job data JD in which the page data is stored and, in addition, a name of a path in which the job data JD is stored).

The created differential position information is used as a comment of confirmation page image data in the process described below.

The confirmation page image data creating unit 174 creates confirmation page image data. The confirmation page image data includes a confirmation page image CI which is hierarchically structured to allow the target inspection page image HI, the inspection page image KI and the differential page image SI to be switched and displayed.

The confirmation page image data creating unit 174 creates the confirmation page image data in the same data format as that of the page data. When, for example, page data is PDF, the confirmation page image data creating unit 174 creates the confirmation page image data in the data format of the PDF format. In this case, the target inspection page image HI, the inspection page image KI and the differential page image SI are hierarchically structured according to a PDF form. Consequently, it is possible to display the confirmation page image data in ADOBE reader (the trademark of Adobe Systems Incorporated) which functions as the page data display unit 176 described below, and display the hierarchically structured target inspection page image HI, inspection page image KI and differential page image SI by way of switching and display.

The confirmation page image data creating unit 174 adds the differential page image attribute information STD created by the differential page image attribute information creating unit 1731 as a comment when creating the confirmation page image data. Consequently, the operator can easily confirm attribute information of differential regions in the differential page image SI.

Further, the confirmation page image data creating unit 174 can hierarchically structure annotation image data created by the annotation image creating unit 1732, too. Consequently, the operator can easily confirm the differential page image SI.

Further, the confirmation page image data creating unit 174 can add differential position information created by the differential position information creating unit 1733 as a comment when creating the confirmation page image data. Consequently, the operator can easily confirm position information of the differential regions in the differential page image SI.

Figure 5:
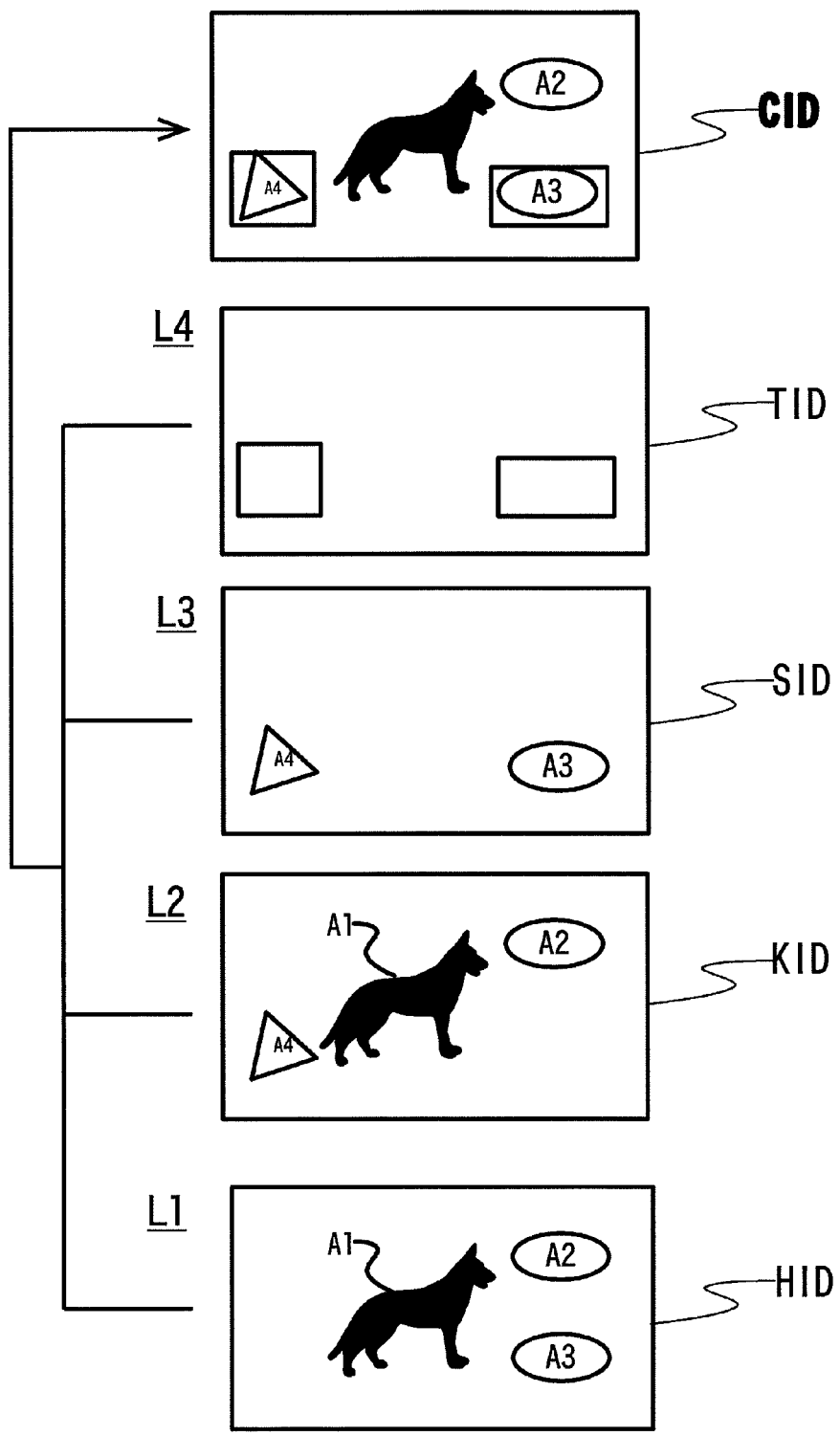
FIG. 5 is a view for explaining confirmation page image data CID created by confirmation page image data creating unit 174.

FIG. 5 is a view for explaining confirmation page image data CID created by the confirmation page image data creating unit 174. As illustrated in FIG. 5, the confirmation page image data CID includes hierarchically structured layers L1, L2, L3 and L4, and all these layers are overlaid, so that the confirmation page image data CID represents the confirmation page image CI.

The confirmation page image data creating unit 174 stores target inspection page image data HID in the lowermost layer L1. Next, the confirmation page image data creating unit 174 stores inspection page image data KID in the layer L2. Similarly, the confirmation page image data creating unit 174 stores differential page image data SID in the layer L3, and stores annotation image data TID created by the annotation image creating unit 1732, in the layer L4. By this means, the hierarchically structured confirmation page image data CID is created. The confirmation page image data creating unit 174 hierarchically structures each image to be capable of being switched and displayed.

In addition, the confirmation page image data creating unit 174 may hierarchically structure the confirmation page image data CID by not directly storing the target inspection page image data HID, the inspection page image data KID, the differential page image data SID or the annotation image data TID. For example, the confirmation page image data creating unit 174 may hierarchically structure the confirmation page image data CID by linking data which represents each image (that is, the target inspection page image data HID, the inspection page image data KID, the differential page image data SID and the annotation image data TID).

Further, when the differential page image attribute information STD and differential position information are created, the confirmation page image data creating unit 174 adds the differential page image attribute information STD and the differential position information as comments to the confirmation page image data CID.

The confirmation page image data creating unit 174 creates the confirmation page image data CID in the same data format as that of page data. Consequently, the target inspection page image HI, the inspection page image KI, the differential page image SI and the annotation image TI are displayed as PDF layers, respectively. Further, it is possible to display the confirmation page image data CID by an application which displays PDF such as ADOBE reader which functions as the page data display unit 176 described below and switch display/non-display of the layers L1, L2, L3 and L4.

The report data creating unit 175 creates the report data RD in which confirmation page image data created by the confirmation page image data creating unit 174 is stored.

The report data creating unit 175 associates each stored confirmation page image data and page data based on which the confirmation page image data is created. That is, the report data creating unit 175 associates the confirmation page image data, and the page data which is a RIP target to obtain the target inspection page image data and inspection page image data used to create the confirmation page image data.

The report data creating unit 175 associates the confirmation page image data and the page data by creating a link page image which is an image to establish a link to the page data, and adding the link page image to the confirmation page image data by way of hierarchically structuring to be capable of being switched and displayed.

By associating the confirmation page image data and the page data in this way, it is possible to easily access the inspection target page data after confirmation page data is inspected. Consequently, associating the confirmation page image data and the page data is useful to, for example, correct the page data.

The report data creating unit 175 creates front cover data when storing confirmation page image data and creating the report data RD. The front cover data is data of a page which is displayed first when the report data RD is displayed. As the front cover data, a report file name, an inspection result, an inspection condition, and a name of page data based on which the confirmation page image data is created are displayed.

The report data creating unit 175 determines a name of the report data RD as a report file name when creating the front cover data. The report file name is determined as a "(date) (name of job data JD) report" based on information of a time at which inspection is performed and the name of the job data JD. For the name of the job data JD which is reported, the file name of the job data JD which is an inspection target is used. Further, the operator of the image inspection data creating device 1 may be encouraged to specify a unique name.

As information on the inspection result obtained by the image inspection data creating device 1, the report data creating unit 175 uses the name of the job data JD which is a reported target and, in addition, the number of inspected pages, a date at which the inspection is performed, the number of items of differential image data and a report file name.

As to the inspection condition, the report data creating unit 175 acquires information of the inspection condition set by the image comparing unit 173 and uses the information to create the front cover data.

As described above, the report data creating unit 175 associates the confirmation page image data and page data based on which the confirmation page image data is created. The report data creating unit 175 acquires a name of the page data based on which the confirmation page image data is created, using the information.

The report data creating unit 175 creates the front cover data in the same data format as that of the confirmation page image data CID, arranges the front cover data at the head of the stored confirmation page image data and creates the report data RD.

Figure 6:
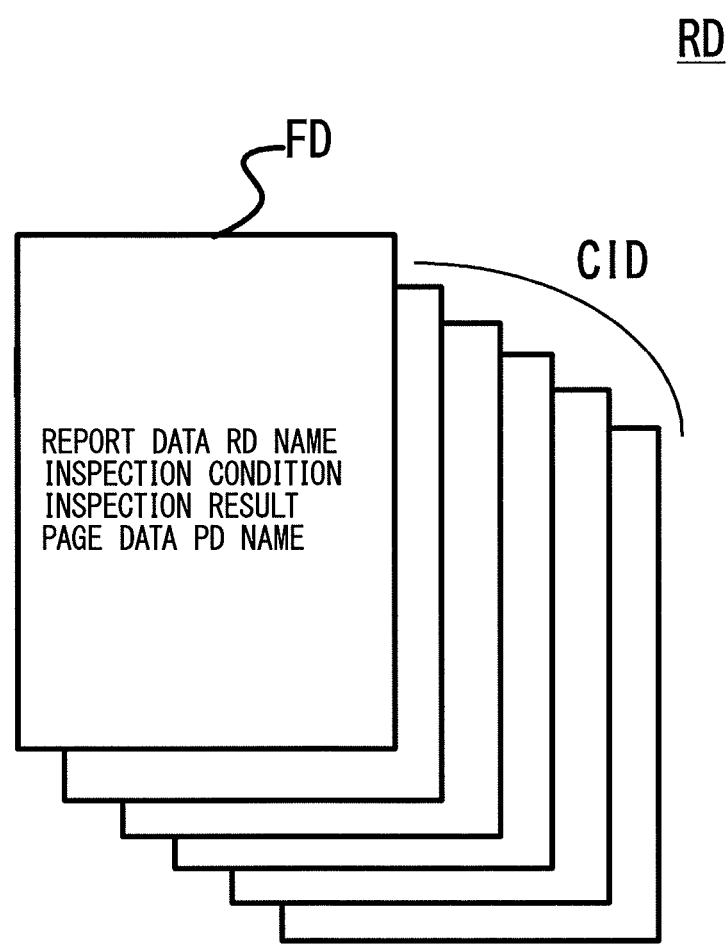
FIG. 6 is a view for explaining the confirmation page image data CID displayed on a display unit 12 of the image inspection data creating device 1.

FIG. 6 is a view for explaining a configuration of the report data RD. As illustrated in FIG. 6, the report data RD is data which includes front cover data FD at a head and the confirmation page image data CID created as a result of performing inspection. When this report data RD is data created in the PDF format, the page is displayed by ADOBE reader, so that it is possible to display the report data RD similar to PDF files which are generally used.

That is, the report data RD is also data of the same format as that of page data, so that the page data display unit 176 described below can display the report data RD. When, for example, page data is data of the PDF format, the report data RD is also data of the PDF format, so that it is possible to display the report data RD by ADOBE reader.

The report data RD created by the report data creating unit 175 is stored in the storage unit 16. The report data RD is displayed on the display unit 12 under control of the page data display unit 176 to be inspected by the operator of the image inspection data creating device 1. Further, when a creator of the job data JD or a RIP operator who prints based on the job data JD requires the report data RD, the report data RD stored in the storage unit 16 is stored in the media disk 18 and conveyed or is transmitted through the network I/F 14 to be displayed on a page data display device outside the image inspection data creating device 1.

The page data display unit 176 performs the display RIP on page data which is described by a page description language and the report data RD, creates a display page image and a display report image, and displays the display page image and the display report image on the display unit 12.

While the confirmation page image data stored in the report data RD is hierarchically structured to be capable of switching and displaying a plurality of images, the page data display unit 176 controls switch and display of the confirmation page image data. Further, the page data display unit 176 controls display of a comment included in the confirmation page image data CID.

The page data display unit 176 displays content of the report data RD on the display unit 12, so that the operator can confirm the difference between the target inspection page image HI and the inspection page image KI using the image inspection data creating device 1.

Figure 7:
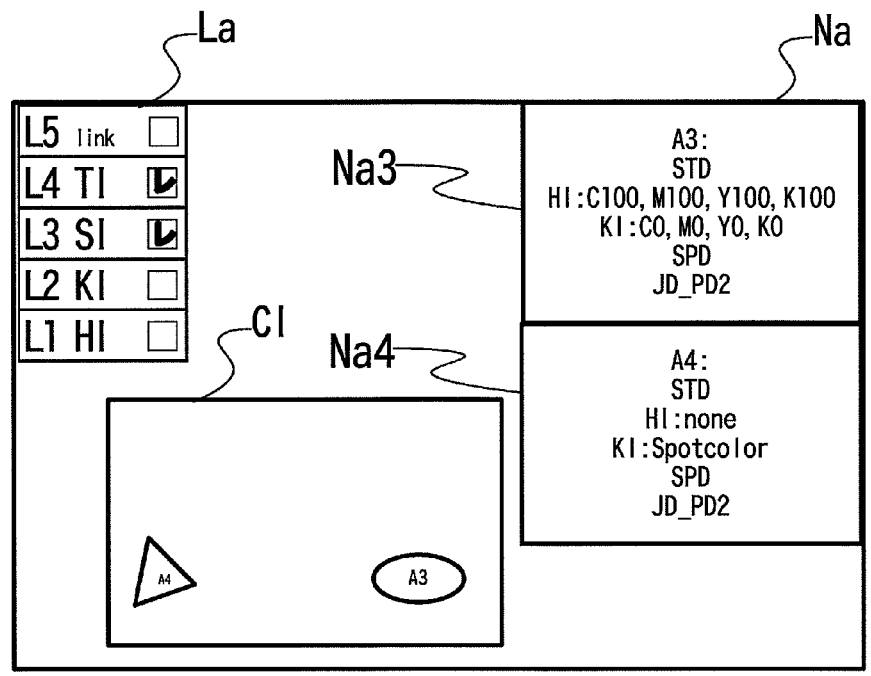
FIG. 7 is a view for explaining a configuration of report data RD.

FIG. 7 is a view illustrating a state where the page data display unit 176 displays the report data RD on the display unit 12.

FIG. 7 illustrates a state where the confirmation page image CI represented by given confirmation page image data stored in the report data RD is displayed on the display unit 12. As illustrated in FIG. 7, the page data display unit 176 displays a layer switch field La and a comment switch field Na on the display unit 12.

The layer switch field La is used to select to display layers of hierarchically structured confirmation page image data. In the layer switch field La, whether or not to display each hierarchically structured layer (that is, the layer L1 in which the target inspection page image data is stored, the layer L2 in which the inspection page image data is stored, the layer L3 in which the differential page image data is stored and the layer L4 in which the annotation image data is stored) upon display of the confirmation page image CI displayed on the display unit 12 is selected by receiving an input from the input unit 13. Selection in the layer switch field La is not exclusive, and a plurality of layers L1 to L4 can be selected. When, for example, all layers L1 to L4 are selected, all layers L1 to L4 can be displayed simultaneously.

In an example in FIG. 7, the layers L3 and L4 are selected upon selection in the layer switch field La. Hence, the page data display unit 176 displays the differential page image SI represented by the differential page image data stored in the layer L3 and the annotation image TI represented by the annotation image data stored in the layer L4, as the confirmation page image CI on the display unit 12.

The comment switch field Na is used to select the differential page image attribute information STD and the differential position information SPD which are attached to each of the image regions A3 and A4 which are displayed based on the differential image data SID included in the confirmation page image data. In the comment switch field Na, selection fields Na3 or Na4 in which the differential page image attribute information STD and the differential position information SPD attached to the image regions A3 or A4 are collected together are displayed.

Here, in the selection field Na3 of the comment switch field Na, "HI: C100, M100, Y100, K100" and "KI: C0, M0, Y0, K0" are displayed as the differential page image attribute information STD attached to the image region A3 and "JD_PD2" which indicates page 2 of the job data JD is displayed as the differential position information SPD. Further, in the selection field Na4 of the comment switch field Na, the differential page image attribute information STD and the differential position information SPD attached to the image region A4 are displayed.

When the operator selects the selection field Na3 of the comment switch field Na through the input unit 13, the page data display unit 176 zooms up and displays the image region A3. Further, by selecting the selection field Na4 of the comment switch field Na through the input unit 13 in this state, the operator can switch a display region to be zoomed up from the image region A3 to the image region A4. In addition, the differential page image attribute information STD and the differential position information SPD may be displayed in a balloon attached to an image region without displaying the comment switch field Na.

Further, a link page image is also hierarchically structured and stored in confirmation page image data to be associated with page data. Consequently, the link page image can be selected as a layer L5 in the layer switch field La illustrated in FIG. 7. When the operator selects to display the layer L5 through the input unit 13, the link page image is additionally displayed in the displayed differential page image SI, and link information of page data (that is, page data based on which the differential page image SI is also created) associated with the confirmation page image data is displayed.

When the operator of the image inspection data creating device 1 inputs the link information through the input unit 13 as the necessity arises, the page data display unit 176 displays the page data on the display unit 12. The page data is displayed, so that the operator can confirm a page image represented by the page data.

In addition, the page data display unit 176 may be implemented by application software which is generally used to display page data. When, for example, the page data and the report data RD are data of the PDF format, ADOBE reader (the trademark of Adobe Systems Incorporated) can be used as the page data display unit 176.

Figure 8:
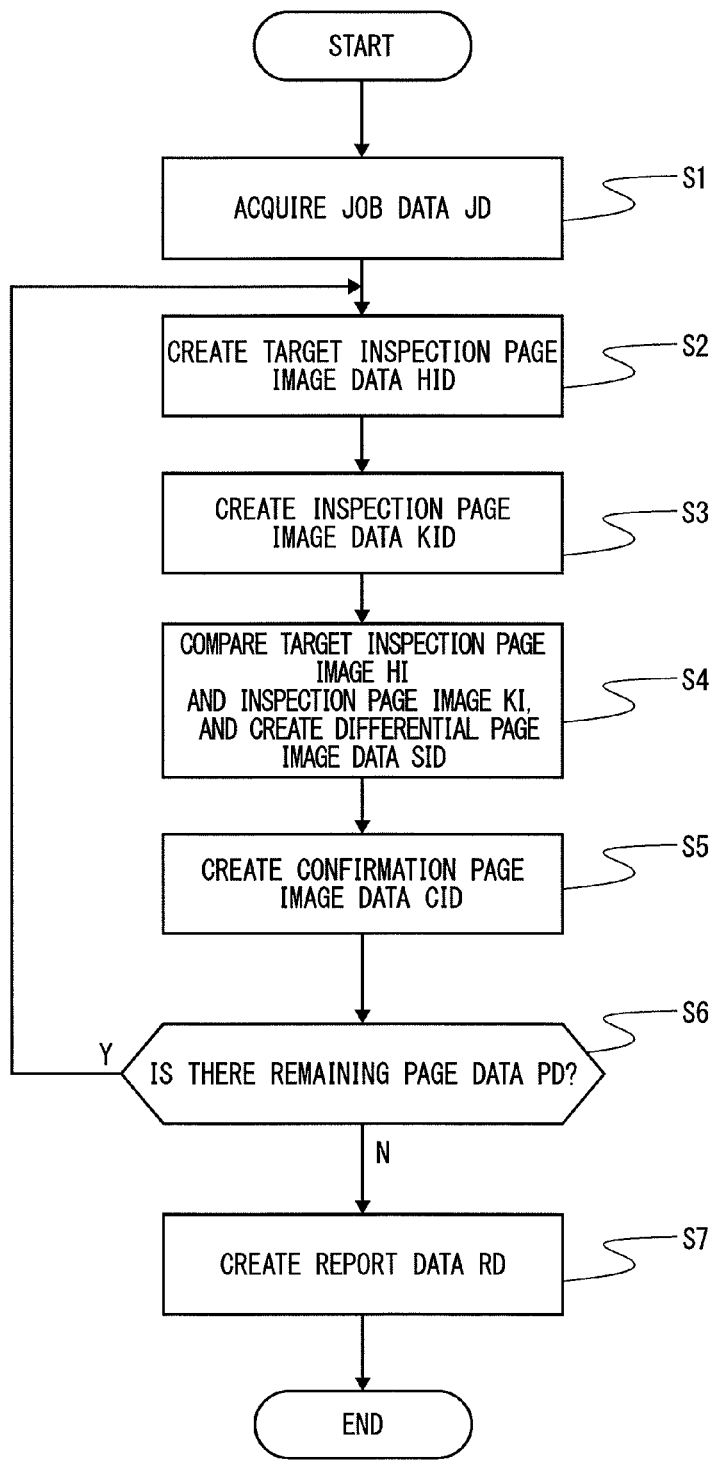
FIG. 8 is a flowchart for explaining an operation of the image inspection data creating device 1.

FIG. 8 is a flowchart for explaining an operation of the image inspection data creating device 1. When the program P stored in the storage unit 16 is executed in the memory 17 by the CPU 11 of the image inspection data creating device 1, the image inspection data creating device 1 executes the following operation.

In step S1, the image inspection data creating device 1 acquires the job data JD in which page data is stored. More specifically, the CPU 11 of the image inspection data creating device 1 acquires the job data JD from a terminal which is not illustrated through a network which is not illustrated and the network I/F 14. Alternatively, the image inspection data creating device 1 acquires the job data JD stored in the media disk 18 through the media drive 15. Further, the image inspection data creating device 1 may employ a configuration including a page data creating element which is not illustrated, and acquire the job data JD in which page data created by the page data creating element is stored.

The job data JD is data in which one or more items of page data used to create one printed material are stored. When a printing control device which is not illustrated performs RIP on the page data stored in the job data JD, a print page image data to print one page is created. When the printing control device which is not illustrated performs RIP on all items of page data stored in the job data JD, one or more items of print page image data to create one printed material are created. The job data JD acquired by the image inspection data creating device 1 is stored in the storage unit 16.

In step S2, the target inspection page image data creating unit 171 creates the target inspection page image data HID by performing RIP corresponding to the print RIP, on the page data stored in the job data JD acquired in step S1. The target inspection page image data HID is data which represents the target inspection page image HI which is a multilevel bitmap image having a resolution corresponding to that of the print page image data outputted from the printing control device which is not illustrated. The created target inspection page image data HID is temporarily stored in the memory 17.

In step S3, the inspection page image data creating unit 172 creates the inspection page image data KID by performing RIP corresponding to the display RIP, on the page data stored in the job data JD acquired in step S1. The inspection page image data KID is data which represents the inspection page image KI which is a multilevel bitmap image having a resolution corresponding to that of the display page image data displayed on the display unit 12 by the page data display unit 176. In step S3, the inspection page image data creating unit 172 may create the inspection page image data KID using the function of the page data display unit 176. The created inspection page image data KID is temporarily stored in the memory 17.

Meanwhile, the target inspection page image data HID is data corresponding to the print page image data, and the inspection page image data KID is data corresponding to the display page image data. This is because, while an object of image inspection of differential page image data created by the image inspection data creating device 1 is to secure that a page image of a printed material looks in the same way as the way a page image of the created page data looks, whether or not the print page image data (target inspection page image data HID) is adequate is inspected based on the display page image data (inspection page image data KID) for this object.

In step S4, the image comparing unit 173 compares the target inspection page image HI represented by the target inspection page image data HID and the inspection page image KI represented by the inspection page image data KID, and creates the differential page image data SID which represents the differential page image SI.

When the resolution of the target inspection page image HI and the resolution of the inspection page image KI do not match, the image comparing unit 173 performs processing of matching both of the resolutions and compares pixels which form the target inspection page image HI and pixels which form the inspection page image KI. Further, the differential page image SI is acquired based on whether or not each pixel has a pixel value, and the differential page image data SID is created. For two image comparing methods of the image comparing unit 173, known methods are adequately used.

Further, in step S4, to easily confirm the differential page image SI represented by the differential page image data, in the image comparing unit 173, the differential page image attribute information creating unit 1731 creates differential page image attribute information, the annotation image creating unit 1732 creates annotation images and the differential position information creating unit 1733 creates differential position information.

In step S5, the confirmation page image data creating unit 174 creates the confirmation page image data CID based on the target inspection page image data HID, the inspection page image data KID and the differential page image data SID. The confirmation page image data CID is data which represents the confirmation page image CI in which the target inspection page image HI, the inspection page image KI and the differential page image SI are hierarchically structured to be capable of being switched and displayed.

The confirmation page image data creating unit 174 stores the target inspection page image data HID in the lowermost layer L1. Subsequently, the confirmation page image data creating unit 174 stores the inspection page image data KID in the layer L2. Similarly, the confirmation page image data creating unit 174 stores the differential page image data SID in the layer L3, and stores the annotation image data TID created by the annotation image creating unit 1732, in the layer L4. By this means, the hierarchically structured confirmation page image data CID having the same data format as that of the page data is created. The confirmation page image data creating unit 174 hierarchically structures each image to be capable of being switched and displayed.

Further, when differential page image attribute information and differential position information are created, the confirmation page image data creating unit 174 adds the differential page image attribute information and the differential position information as comments to the confirmation page image data CID.

In step S6, the image inspection data creating device 1 determines whether or not there is page data which needs to be inspected in the job data JD. More specifically, the image inspection data creating device 1 determines whether or not there is page data which needs to be inspected left in the job data JD stored in the storage unit 16, based on the number of pages specified by the image comparing unit 173. When determining that there is page data which needs to be inspected left, the image inspection data creating device 1 returns the operation to step S1, repeats process in steps S2 to S5, and creates the confirmation page image data CID. Meanwhile, when determining that there is no page data which needs to be inspected, the image inspection data creating device 1 moves the operation to step S7.

In step S7, the report data creating unit 175 creates the report data RD in which the confirmation page image data CID created in step S5 is stored. In the report data RD created by the report data creating unit 175, the confirmation page image data CID which is data having the same format as that of page data is stored. Hence, the report data RD is also data having the same format as that of page data. When creation of the report data RD is finished, the image inspection data creating device 1 finishes the operation.

Figure 9:
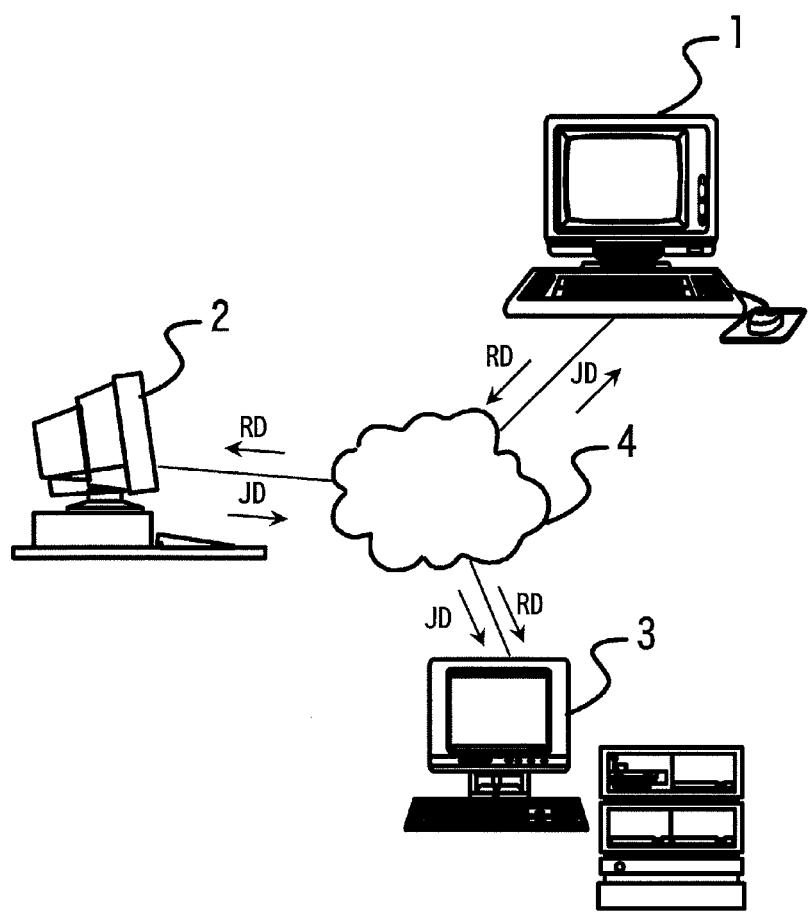
FIG. 9 is a view for explaining a state where the report data RD created by the image inspection data creating device 1 is transmitted to page data display devices 2 and 3 through a network 4.

FIG. 9 is a view illustrating a state where the report data RD created by the image inspection data creating device 1 is transmitted to page data display devices 2 and 3 through the network 4. The creator of the job data JD has the page data display device 2, and the RIP operator who performs RIP to print the job data JD has the page data display device 3.

The creator of the job data JD transmits the job data JD to the image inspection data creating device 1 through the network 4 to determine whether or not the created job data JD can be adequately printed.

The image inspection data creating device 1 performs the processing on the received job data JD based on the flowchart illustrated in FIG. 8, creates the report data RD and transmits the report data RD to the creator of the job data JD through the network 4.

By displaying the report data RD on the page data display device 2, the creator of the job data JD can confirm whether or not a description of the page data included in the created job data JD is adequate. Consequently, it is possible to determine whether or not printing can be executed adequately before the RIP operator performs RIP.

Meanwhile, the RIP operator who receives the job data JD through the network 4, and performs RIP on the job data JD transmits the job data JD to the image inspection data creating device 1 through the network 4 when it is not possible to obtain an adequate result by performing RIP on the job data JD.

The image inspection data creating device 1 performs the processing on the received job data JD based on the flowchart illustrated in FIG. 8, creates the report data RD and returns the report data RD to the RIP operator through the network 4.

By displaying the report data RD on the page data display device 3, the RIP operator can confirm whether a RIP mistake is caused by a trouble upon RIP or there is an inadequate description upon creation of the job data JD. Consequently, it is possible to prevent a trouble of RIP when RIP is performed on the job data JD again.

Modified Example

Although the target inspection page image data HID and the inspection page image data KID are created before an image inspection condition is set as described above, the target inspection page image data HID and the inspection page image data KID may be created after the image inspection condition is set in step S4.

Further, although the image inspection data creating device 1 is a single computer as described above, the functions of the target inspection page image data creating unit 171 and the inspection page image data creating unit 172 may be assigned to separate computers. More specifically, by using as the target inspection page image data creating unit 171 a print control device which performs the print RIP on the job data JD, and using as the inspection page image data creating unit 172 a page display device which performs the display RIP on the job data JD, the target inspection page image data HID and the inspection page image data KID may be created, and the created target inspection page image data HID and inspection page image data KID may be acquired through the network I/F 14 or acquired through the media disk 18.

While the invention has been shown and described in detail, the foregoing description is in all aspects illustrative and not restrictive. It is therefore understood that numerous modifications and variations can be devised without departing from the scope of the invention.

What is claimed is:

1. An image inspection data creating device comprising:
a target inspection page image data creating element which creates target inspection page image data corresponding to print page image data to be printed by a printing machine, based on page data for creating a printed material;
an inspection page image data creating element which creates inspection page image data corresponding to display page image data to be displayed on a page data display device, based on said page data;
a differential page image data creating element which creates differential page image data by comparing a target inspection page image represented by said target inspection page image data and an inspection page image represented by said inspection page image data; and
a differential page image attribute information creating element which creates differential page image attribute information by acquiring attribute information of an image region of said target inspection page image and an image region of said inspection page image corresponding to a differential page image represented by said differential page image data, from said target inspection page image data and said inspection page image data.

2. The image inspection data creating device according to claim 1, wherein said differential page image data creating element creates annotation image data which emphasizes a presence of the differential page image represented by said differential page image data.

3. The image inspection data creating device according to claim 1, wherein said differential page image data creating element acquires a position of said differential page image from said page data, and creates differential position information.

4. The image inspection data creating device according to claim 1, further comprising a confirmation page image creating element which creates confirmation page image data which adopts a hierarchical structure which allows said target inspection page image, said inspection page image and said differential page image to be switched and displayed, and which includes said differential page image attribute information as a comment on said differential page image.

5. The image inspection data creating device according to claim 4, wherein said confirmation page image data creating element adds annotation image data to the hierarchical structure of said confirmation page image data which can be switched and displayed.

6. The image inspection data creating device according to claim 4, wherein said confirmation page image data creating element adds differential position information as the comment of said confirmation page image data.

7. The image inspection data creating device according to claim 4, further comprising a report data creating element which associates and stores said confirmation page image data and said page data based on which the confirmation page image data is created, and creates report data of a same data format as that of said page data.

8. The image inspection data creating device according to claim 1, further comprising a display element which displays said differential page image attribute information.

9. A non-transitory recording medium which has a program which causes a computer to function as an image inspection data creating device and which is executed in a memory by a CPU of said computer recorded thereon, and which can be read by said computer, wherein, when said program is executed by said computer, said program causes said image inspection data creating device to execute:
a target inspection page image data creating step of creating target inspection page image data corresponding to print page image data to be printed by a printing machine, based on page data for creating a printed material;
an inspection page image data creating step of creating inspection page image data corresponding to display page image data to be displayed on a page data display device, based on said page data;
a differential page image data creating step of creating differential page image data by comparing a target inspection page image represented by said target inspection page image data and an inspection page image represented by said inspection page image data; and
a differential page image attribute information creating step of creating differential page image attribute information by acquiring attribute information of an image region of said target inspection page image and an image region of said inspection page image corresponding to a differential page image represented by said differential page image data, from said target inspection page image data and said inspection page image data.

10. An image inspection data creating method comprising the steps of:
a) creating target inspection page image data corresponding to print page image data to be printed by a printing machine, based on page data for creating a printed material;
b) creating inspection page image data corresponding to display page image data to be displayed on a page data display device, based on said page data;

c) creating differential page image data by comparing a target inspection page image represented by said target inspection page image data and an inspection page image represented by said inspection page image data; and d) creating differential page image attribute information by acquiring attribute information of an image region of said target inspection page image and an image region of said inspection page image corresponding to a differential page image represented by said differential page image data, from said target inspection page image data and said inspection page image data.

11. The image inspection data creating method according to claim 10, wherein said step c) includes creating annotation image data which emphasizes a presence of the differential page image represented by said differential page image data.

12. The image inspection data creating method according to claim 10, wherein said step c) includes acquiring a position of said differential page image from said page data, and creating differential position information.

13. The image inspection data creating method according to claim 10, further comprising the step of:

e) creating confirmation page image data which adopts a hierarchical structure which allows said target inspection page image, said inspection page image and said differential page image to be switched and displayed, and which includes said differential page image attribute information as a comment on said differential page image.

14. The image inspection data creating method according to claim 13, wherein said step e) includes adding annotation image data to the hierarchical structure of said confirmation page image data which can be switched and displayed.

15. The image inspection data creating method according to claim 13, wherein said step e) includes adding differential position information as the comment of said confirmation page image data.

16. The image inspection data creating method according to claim 13, further comprising the step of:

f) associating and storing said confirmation page image data and said page data based on which the confirmation page image data is created, and creating report data of a same data format as that of said page data.

17. The image inspection data creating method according to claim 10, further comprising the step of:

g) displaying said differential page image attribute information.

* * * * *